United States Patent [19]

Tanaka et al.

[11] 4,349,166

[45] Sep. 14, 1982

[54] MAGNETIC TAPE CASSETTE

[75] Inventors: Kimio Tanaka; Toshihiko Ishida, both of Tokyo, Japan

[73] Assignee: TDK Electronics Co., Ltd., Tokyo, Japan

[21] Appl. No.: 164,007

[22] Filed: Jun. 30, 1980

[30] Foreign Application Priority Data

Jul. 17, 1979 [JP] Japan .................. 54/97968[U]

[51] Int. Cl.³ .................. G03B 1/04; G11B 15/32; G11B 23/04
[52] U.S. Cl. .................. 242/197; 206/389; 220/4 B
[58] Field of Search .................. 242/197–200, 242/55.19 A, 192; 206/389, 391; 360/96, 105, 132; 220/1 R, 4 B, 4 E

[56] References Cited

U.S. PATENT DOCUMENTS

| 3,655,145 | 4/1972 | Olsen | 242/197 |
| 3,834,650 | 9/1974 | Hall | 242/192 |
| 3,857,531 | 12/1974 | Jantzen | 242/197 |
| 4,227,622 | 10/1980 | Okamura et al. | 220/4 B |

Primary Examiner—Leonard D. Christian
Attorney, Agent, or Firm—Oblon, Fisher, Spivak, McClelland & Maier

[57] ABSTRACT

A magnetic tape cassette comprises an upper half casing and a lower half casing provided with a screw holder having a threaded hole at the corner of the lower half casing for connecting said upper half casing, wherein the thickness of the wall of the screw holder facing inside the casing is reduced and at least one rib having a level flush with the fitting surface of the lower half casing is formed at the inside portion of the screw holder.

2 Claims, 8 Drawing Figures

MAGNETIC TAPE CASSETTE

BACKGROUND OF THE INVENTION

1. Field of the Invention

The present invention relates to a magnetic tape cassette. More particularly, it relates to an improvement of a screw holder receiving a screw for connecting an upper half casing and a lower half casing after the assembling of said two half casings.

2. Description of the Prior Art

The magnetic tape cassette usually comprises the upper half casing, a lower half casing to be assembled with the upper half casing and a magnetic tape wound on a hub which is held in the assembly of the two half casings. Therefore, screw holders, also known as screw receivers, are formed at the four corner of each half casing for connecting the assembled upper and lower half casings with screws.

FIG. 1 is a cross sectional view of one corner portion of the lower half casing (1) of the conventional magnetic tape cassette. As shown in the figure, a screw holder (2) is formed in the corner portion. The screw holder (2) is integrally connected to the front wall (4) and the side wall (6) of the lower half casing. The reference numeral (8) designates a guide pole, (10) designates a guide roller and (12) designates an M shaped rib.

The lower half casing (1) has a fitting surface (3) on which the upper half casing (20) is placed, as shown in FIG. 2. The screw holder (2) of the lower half casing is provided with an annular boss (5) projecting upward from the fitting surface, while the upper half casing (20) is provided with a caved portion (22) for receiving the annular boss (5) at the corresponding position; thus the positions of the lower half casing (1) and the upper half casing (20) are determined. A threaded hole is formed in the annular boss (5) and the screw holder (2). The thickness of wall of the annular boss (5) is smaller than that of the screw holder (2) so that stop shoulders (2'),(2") are provided on the upper surface of the screw holder (2), namely the fitting surface (3) to support the upper half casing (20). Accordingly, when a tapping screw (30) is threaded through a counter-sunk hole (24) of the upper half casing (20) into the threaded hole (14) of the screw holder (2), the upper half casing (20) is brought into contact with the fitting surface (3) and the stop shoulder (2') of the lower half casing (1) to provide an integral connection between them. However, it is necessary to provide a substantial thickness of the wall of the screw holder (2) to provide the stop shoulders (2'), (2") on the screw holder (2) of the lower half casing (1). The provision of the stop shoulders results in a large recess on the reverse side surface (7) of the screw holder as the reverse surface of the tape cassette during the molding operation; thus the accuracy of size such as parallel shape, flatness of the magnetic tape cassette is greatly reduced and the appearance is spoilt.

In order to overcome the disadvantage of occurrence of "recess" in the screw holder, an attempt in which the stop shoulder (2") placed inside the screw holder (2) (FIG. 2) is removed and the thickness of wall of the screw holder (2) is reduced, that is, it has a thickness the same as that of the annular boss (5) as shown in FIGS. 3 and 4, has been proposed. This attempt substantially reduces the occurrence of the "recess" while the area of the stop shoulder of the screw holder (2) is reduced by as much as about half. The upper half casing is, therefore, easily deformed thus not being completely parallel.

SUMMARY OF THE INVENTION

It is an object of the present invention to provide a magnetic tape cassette which prevents the occurrence of "recess" during the molding and prevents the reduction of the accuracy of size such as parallel shape and flatness in the assembled product.

The foregoing and other objects of the present invention have been attained by providing a magnetic tape cassette wherein the thickness of the wall of a screw holder facing the inside of the casing is reduced, said screw holder having threaded holes formed at the four corners of a lower half casing for connecting the lower half casing with an upper half casing, and at least one rib having a level as high as a stop shoulder is formed at the inner side wall of the screw holder.

DETAILED DESCRIPTION OF THE PREFERRED EMBODIMENTS

Figure 1:
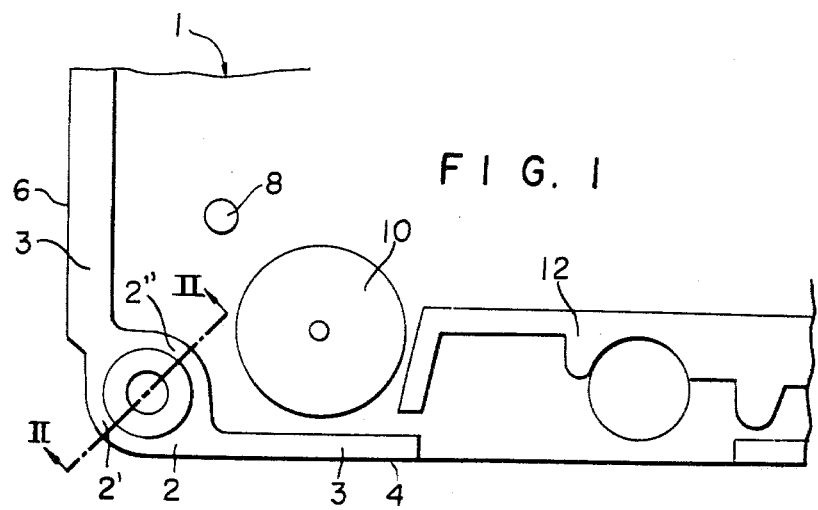
FIG. 1 is a partially plane view of a lower half casing of the conventional magnetic tape cassette.

Referring to the drawings, one embodiment of the present invention will be described.

Figure 2:
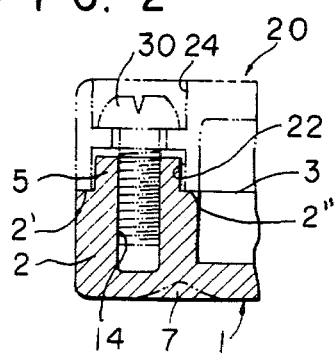
FIG. 2 is a cross sectional view taken along II—II line of FIG. 1.
Figure 3:
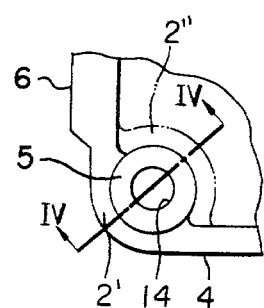
FIG. 3 is a partially plane view of a screw holder of the lower half casing of the conventional magnetic tape cassette.
Figure 4:
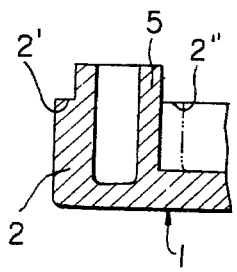
FIG. 4 is a cross sectional view taken along IV—IV line of FIG. 3.
Figure 5:
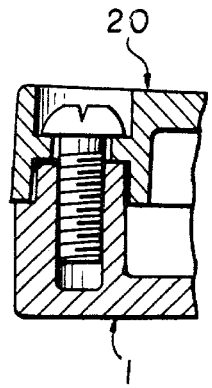
FIG. 5 is a cross sectional view of the corner portion of the conventional magnetic tape cassette when the lower half casing shown in FIG. 3 is connected to an upper half casing.
Figure 6:
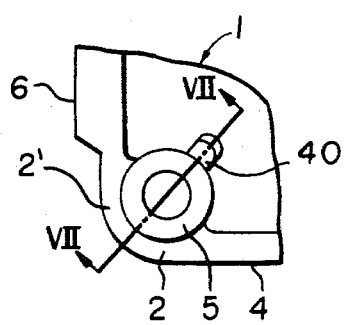
FIG. 6 is a plane view of a screw holder of the lower half casing of the magnetic tape cassette of the present invention.
Figure 7:
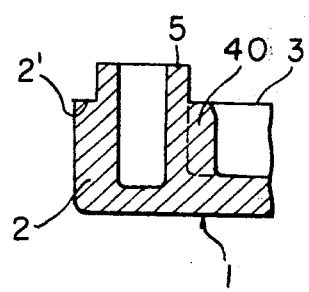
FIG. 7 is a cross sectional view taken along VII—VII line of FIG. 6.
Figure 8:
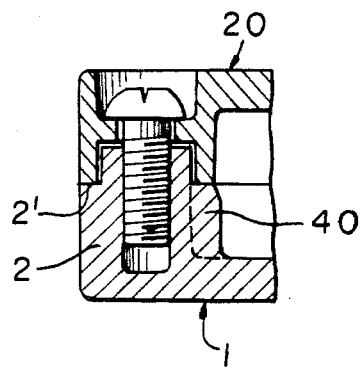
FIG. 8 is a cross sectional view of the corner portion of the magnetic tape cassette of the present invention when assembled.

FIGS. 6 and 7 show one embodiment of the lower half casing (1) which reduces the area of the stop shoulder similar to the embodiment as shown in FIGS. 3 and 4. The feature of the present invention is to provide a rib (40) in a position where a part of the stop shoulder is removed. The top surface of the rib, that is, the fitting surface (3) of the lower half casing is flush with the stop shoulder (2'). However, the height of the rib (40) can be different from that of the stop shoulder (2') when the height of the rib (40) is flush with the level of the fitting surface (3) which is not flush with the stop shoulder (2') as long as the corresponding parts of the upper half casing are in close contact with these portions. Thus, the rib (40) is formed facing the inside of the casing at the screw holder (2) of the lower half casing. Accordingly, when the upper half casing (20) is put on the lower half casing (1) the upper half casing (20) is firmly held by the stop shoulder (2') and the rib (40) of the screw holder (2) as shown in FIG. 8 to prevent the reduction of the accuracy of size of the assembled magnetic tape cassette. The thickness of the wall of the screw holder (2) is substantially less than that of the conventional screw holder as shown in FIG. 2, thereby preventing the occurrence of the "recess" and improving the appearance. The outer periphery of the screw holder (5) shown in FIGS. 6 to 8 is formed in coaxial with the threaded hole (14). However, it is not essential to make the outer periphery of the screw holder (5) in coaxial with the threaded hole (14) but it can have any curvature or any shape as long as the thickness of the wall of the screw holder after removing the stop shoulder (2") prevent the occurrence of the "recess" on the reverse surface of the casing and has a strength sufficient to hold the screw for fixing the upper half casing to the lower half casing in the threaded hole (14).

FIG. 6 shows that only one rib (40) is provided on the screw holder (2). A plurality of ribs can be provided to it, if desired.

We claim:

1. In a magnetic tape cassette for tape wound on a hub, comprising an upper half casing and a lower half casing, said lower half casing being provided with at least one screw receiver having a threaded hole near at least one corner of the lower half casing, said upper half casing being provided with an opening corresponding to each of said screw receivers for carrying a screw, the improvement comprising a first wall portion for a screw receiver being integrally connected to two walls of the lower half casing and a second wall portion being unconnected to said casing walls, at least one rib radially extending from said second wall portion, wherein said second wall portion is lessened in thickness and said rib has a top surface which is equal in height to the top surface of the walls of the lower half casing.

2. A magnetic tape cassette according to claim 1 wherein said first wall portion contains a stop shoulder and the level of the rib is flush with said stop shoulder at the outside of the screw receiver.

* * * * *

UNITED STATES PATENT AND TRADEMARK OFFICE
CERTIFICATE OF CORRECTION

PATENT NO. : 4,349,166

DATED : September 14, 1982

INVENTOR(S) : KIMIO TANAKA ET AL

It is certified that error appears in the above-identified patent and that said Letters Patent is hereby corrected as shown below:

```
On the title page, Assignee should read
[30] -- Foreign Application Priority Data
       Jul. 17, 1979  [JP] Japan......54/97568 [U] --
```

Signed and Sealed this

Tenth Day of May 1983

[SEAL]

Attest:

GERALD J. MOSSINGHOFF

Attesting Officer

Commissioner of Patents and Trademarks